United States Patent
Zoranovic et al.

(10) Patent No.: US 7,453,810 B2
(45) Date of Patent: Nov. 18, 2008

(54) METHOD AND APPARATUS FOR CLOSED LOOP, OUT-OF-BAND BACKPRESSURE MECHANISM

(75) Inventors: Milan Zoranovic, Kanata (CA); Brian McBride, Stittsville (CA); Peter Rabinovitch, Kanata (CA)

(73) Assignee: Alcatel Lucent, Paris (FR)

( * ) Notice: Subject to any disclaimer, the term of this patent is extended or adjusted under 35 U.S.C. 154(b) by 902 days.

(21) Appl. No.: 10/898,989

(22) Filed: Jul. 27, 2004

(65) Prior Publication Data

US 2006/0023705 A1    Feb. 2, 2006

(51) Int. Cl.
*H04L 1/00* (2006.01)
*H04L 12/56* (2006.01)

(52) U.S. Cl. .................................... 370/236; 370/416
(58) Field of Classification Search ................. 370/412, 370/229, 417, 235–236, 375–376, 370–371
See application file for complete search history.

(56) References Cited

U.S. PATENT DOCUMENTS

| | | | | |
|---|---|---|---|---|
| 5,475,682 A | * | 12/1995 | Choudhury et al. | 370/229 |
| 5,493,566 A | * | 2/1996 | Ljungberg et al. | 370/231 |
| 5,689,500 A | * | 11/1997 | Chiussi et al. | 370/235 |
| 5,768,257 A | * | 6/1998 | Khacherian et al. | 370/229 |
| 6,011,779 A | * | 1/2000 | Wills | 370/236 |
| 6,067,298 A | * | 5/2000 | Shinohara | 370/395.71 |
| 6,304,554 B1 | * | 10/2001 | Matsumura et al. | 370/236 |
| 6,771,596 B1 | * | 8/2004 | Angle et al. | 370/229 |
| 7,180,862 B2 | * | 2/2007 | Peebles et al. | 370/235 |
| 7,263,066 B1 | * | 8/2007 | Yun et al. | 370/236 |
| 2001/0026551 A1 | * | 10/2001 | Horlin | 370/389 |
| 2003/0169773 A1 | * | 9/2003 | Gilsdorf | 370/503 |
| 2004/0100980 A1 | * | 5/2004 | Jacobs et al. | 370/412 |
| 2005/0088969 A1 | * | 4/2005 | Carlsen et al. | 370/229 |

* cited by examiner

*Primary Examiner*—Kwang B. Yao
*Assistant Examiner*—Warner Wong

(57) ABSTRACT

A backpressure mechanism uses a TDM backpressure bus with each port card being assigned time slot. During its time slot, each ingress card/port writes on the bus the number of packets it transmitted to an egress ports during the last data refresh cycle. This information is read by the egress ports and used to compute current depth of the switch fabric output queues. In addition to information received from ingress cards, egress cards keep count of number of packets received from the appropriate switch fabric port and based on it estimate/calculate the current depth of the switch fabric output queue. Congestion states are calculated for all queues by comparing the queue depth with a respective threshold. Each egress card uses these congestion states to generate backpressure signals to ingress cards. Ingress card are using these signals to make decision whether to send or not traffic to destination egress card/port.

25 Claims, 3 Drawing Sheets

METHOD AND APPARATUS FOR CLOSED LOOP, OUT-OF-BAND BACKPRESSURE MECHANISM

FIELD OF THE INVENTION

The invention is directed to communication networks and in particular to a closed loop backpressure mechanism for a switch/router system.

BACKGROUND OF THE INVENTION

Current demands for communications speed and capacity of modern data networks have created a need for superior performance network architectures that are highly scalable and can effectively handle large amounts of multicast and unicast traffic. These networks are expected to support multimedia applications, and to be capable of dynamic reconfiguration, so as to guarantee a predetermined amount of bandwidth for an agreed-for quality of service (QoS). Emerging services such as integrated voice, video and data applications are increasing the need for the network providers to guarantee a certain variable QoS to each user, based on the user's particular needs at a particular time. This requirement can only be achieved by incrementally integrating into the network new hardware and software developments designed to address specific problems arising as the network grows and the customer demand for new services evolves.

The ever-increasing variety of communications applications has created a need for node architectures that use a wide selection of line and switch board designs that enable flexible and high performance digital, analog or hybrid switching systems. Problems arise where a receiving port cannot assimilate information as fast as it is delivered, or where the priority of the traffic varies. If the amount of data accumulated at the cross-point in a switch or a router exceeds capacity of the data storage, data is discarded, thus forcing the destination port to request data re-transmission. A solution for handling this congestion problem is to use a "brute-force" approach by providing sufficient data storage at each possible cross-point. However, this solution is rather expensive and necessitates additional real-estate capacity on the boards that make-up the network switches and/or routers.

It has also become common to pre-allocate receiver buffer credits to data sources and notify the corresponding sender how much data can be sent. Upon detection of congestion, either at an egress port, or within a node, the receiver withholds buffer credits, forcing the corresponding sender to slow down the launching of packets or to stop transmission altogether. This process is known as "backpressure" congestion control. In general, a backpressure mechanism provides communication between egress and ingress line cards of a switch/router in an attempt to minimize data loss, head-of-line blocking and delay. Backpressure congestion control is achieved by efficiently managing the congestion levels at the switch fabric and egress line cards, and by timely propagating this information to the ingress line cards. This communication is usually carried through the switch fabric card (in-band).

In-band backpressure mechanisms assume that all elements of the backpressure path can support it. However, many current switch fabric implementations do not support any kind of in-band backpressure mechanism. In these cases, when there is a need to upgrade the switch/router in order to implement new applications with QoS guarantees, an alternative solution which can provide the same capabilities needs to be used, rather than replacing the entire switch/router.

SUMMARY OF THE INVENTION

It is an object of the invention to provide a closed loop backpressure mechanism that alleviates totally or in part the drawbacks of the prior art congestion control mechanisms.

Accordingly, the invention provides a backpressure mechanism for a communication node that routes a protocol data unit (PDU) along a datapath established between an ingress port and an egress port through a switch fabric (SF) egress port. The backpressure mechanism comprises a backpressure bus for establishing an out-of-band bidirectional connection between the ingress port and the egress port; an egress logic for estimating a congestion state indication characterizing the congestion along the datapath; and an ingress logic for controlling transmission of the PDU along the datapath based on the congestion state indication, wherein the egress logic transmits the congestion state indicator to the ingress logic over the backpressure bus, while the ingress logic transmit traffic statistics to the egress logic over the backpressure bus.

The invention is also directed to a frame for an out-of-band backpressure bus for providing a closed loop along a datapath established between an ingress port and an egress port over a switch fabric (SF) egress port of a communication node, comprising: an egress ports timeslot $T_{be}$ for carrying a congestion state indication providing the congestion state of the datapath for a data refresh interval $T_d$; and an ingress port timeslot $T_{bi}$ for carrying a count of PDU's transmitted to the SF egress port during the data refresh interval $T_d$.

The invention is furthermore directed to a method for improving traffic throughput along a datapath established at a communication node between an ingress port and an egress port through a switch fabric (SF) egress port. The method comprises (a) estimating a congestion state indication characterizing the congestion along the datapath; (b) establishing an out-of-band bidirectional connection between the ingress port and the egress port using a backpressure bus; (c) transmitting the congestion state indicator to the ingress port over the backpressure bus, and transmitting traffic statistics to the egress port over the backpressure bus; and (d) controlling transmission of the PDU along the datapath based on the congestion state indication.

The mechanism of this invention is particularly suitable for communication systems which require real-time routing and switching of digitized cells of data.

Advantageously, the closed-loop backpressure mechanism according to the invention does not require replacement of switch fabric cards on existing switches/routers with sophisticated and expensive switch fabric cards that support QoS guarantees. In other words, the mechanism according to the invention can provide service differentiation even in the case when the switch fabric card cannot; it can be simply implemented without the need to replace the switch fabric card. This results in extending the life of a switch/router, in that it enables a network provider to collect more revenue with a minor investment to the existing equipment.

Similar considerations apply also when building a new system. In this case, instead of using/designing expensive, sophisticated new switch fabric cards for providing the users with added QoS performance, the system can use simple and inexpensive off-the-shelf switch fabric cards and still achieve the agreed-upon QoS performance guarantees by implementing the mechanism of the present invention.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Allowing a switch fabric to congest results in large delays, packet loss and blocking. Assuming there is no in-band mechanism for the egress or switch fabric datapath to indicate congestion status to the ingress datapath in a reasonable time frame, an out-of-band backpressure mechanism becomes a practical solution to address congestion. The backpressure mechanism of the invention is based on closed-loop, out-of-band communication between egress and ingress line cards, using a backpressure bus. The invention is particularly useful for nodes where the switch fabric cannot guarantee the required QoS.

Figure 1:
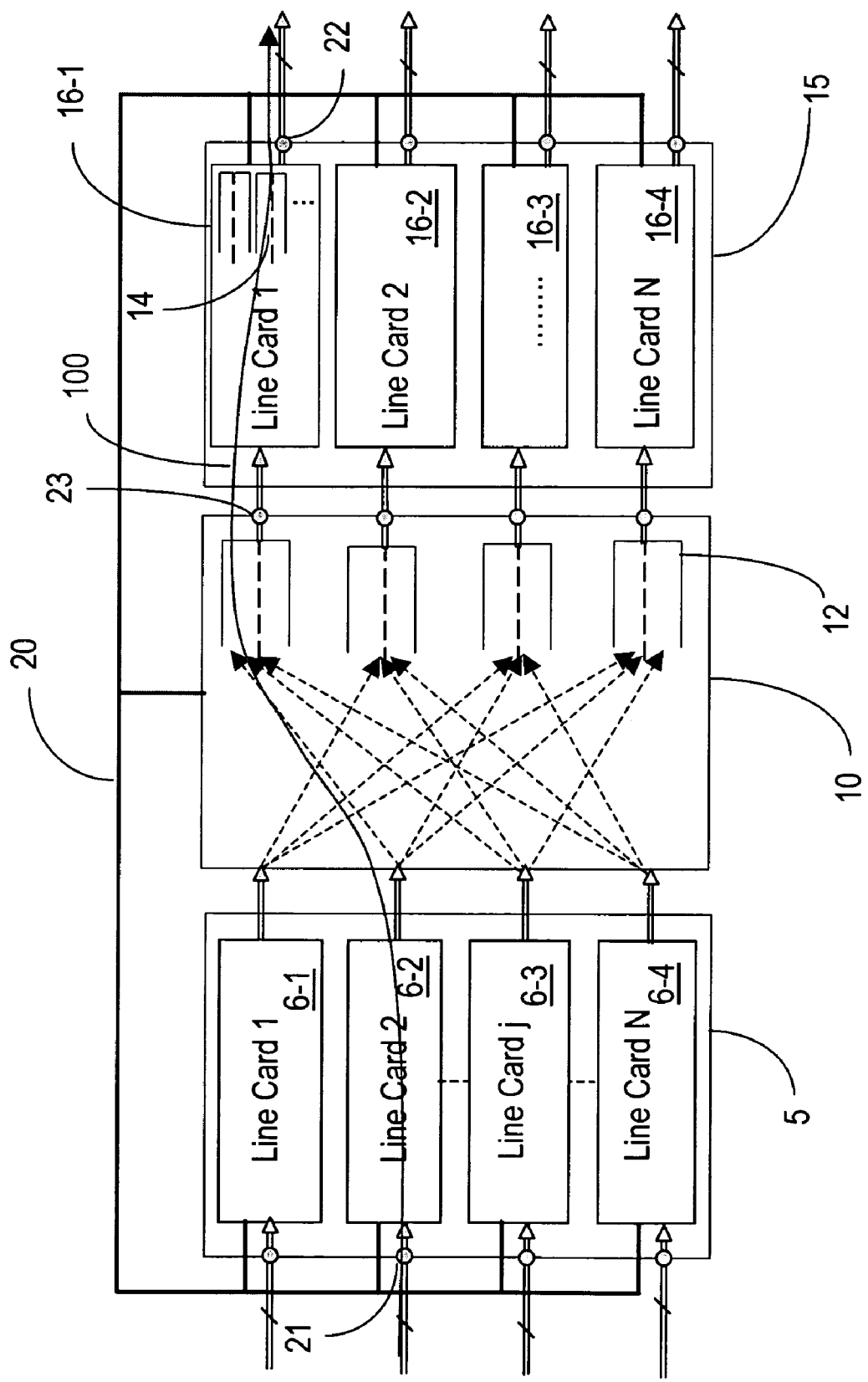
FIG. 1 is a block diagram showing the architecture of an out-of-band backpressure mechanism.

FIG. 1 shows the architecture of the out-of-band backpressure mechanism, illustrating a node with an ingress interface 5, an egress interface 15 and a switch fabric (SF) card 10 connected between interfaces 5 and 15. Each ingress and egress interface comprises a plurality of line cards denoted with 6-1, 6-2, 6-3, 6-4 and respectively 16-1, 16-2, 16-3, 16-4. Each egress card 6 maintains a plurality of logical queues 14 (e.g. 8 queues for 8 QoS levels) for each egress port, which queue hold protocol data units (PDU) destined to that egress port and that have the same QoS guarantee. For example, for four output ports and eight QoS levels, an egress card 16 maintains 4×8=32 counters. These queues are called herein "QoS queues" or "logical queues". The switch fabric card 10 also maintains an egress queue 12 for each switch fabric egress port 22, for ordering the PDU's received from various SF ingress ports after switching. These queues are called herein "SF queues". The PDU's are arranged in queues 12, 14 in the order of arrival, and if a queue becomes congested (the buffer becomes full) the PDU's are discarded.

The traffic is illustrated on FIG. 1 using a double line with the intention to show that the line cards have in fact multiple ports. FIG. 1 also shows by way of example the route of a PDU through the switch/router, hereinafter called "datapath" 100. Datapath 100 is established in this example between ingress port 21 on ingress card 6-2 and egress port 22 on egress card 16-1. In this case, ingress port 21 receives a PDU from a source within the network, determines the address of the SF egress port 23 on card 10, and transmits the PDU to switch fabric 10. The switch fabric 10 routes the PDU to SF egress port 23, where the PDU is placed in the SF queue 12. When its turn arrives, the PDU is transmitted from SF egress port 23 to card 16-1, where the PDU is placed in an appropriate QoS queue 14 at egress port 22, based on the QoS of that PDU. Then, when its turn comes, the PDU is transmitted by egress port 22 to a destination within the network. In the following, the data (traffic) refresh cycle is denoted with $T_d$.

FIG. 1 also shows, in a thick line, a backpressure bus 20, which provides two-way communications between the ingress and egress line cards. The backpressure mechanism of the invention manages the size of the egress queues to reduce excessive queuing by providing the ingress line cards with control of PDU discard, for improved delay performance and limited blocking conditions. Bus 20 is connected to all line cards that participate in the backpressure mechanism, preferably via backplane connectors. This architecture allows the switch element of the present invention to be employed for example in "closed-loop" ATM systems to maximize data throughput through the switch without losing cells.

For optimal use of the bus capacity, backpressure bus 20 uses a TDM (time division multiplexing) protocol. A TDM solution avoids use of overhead bits and the related hardware and software for overhead bits processing, and also avoids use of bus arbitration mechanisms. We denote here the refresh cycle for the backpressure bus with $T_b$.

In this example, all ingress interface cards, egress interface cards and switch fabric cards are connected over bus 20. It is to be noted that a variant where the switch fabric is not connected to bus 20 may also be envisaged, as discussed later. Also, it is possible to have less that all ingress and egress cards connected over the bus, depending on what level of QoS offering is provided and which users are enabled with this service. As indicated above, the solution presented in FIG. 1 may be used for nodes where the switch fabric cannot guarantee a required quality of service, in that is uses early or less expensive card (board) variants that do not enable QoS differentiation.

Each line card 6, 16 that participates in the backpressure mechanism writes/reads on/from the backpressure bus 20 during one backpressure frame $T_b$; the time slots in the frame are assigned such that when one card is writing on the bus, other cards can read. Backpressure bus frame format and speed are proprietary, and can be customized for the respective node configuration. The maximum length of backpressure refresh cycle $T_b$ must be short enough so that egress ports can backpressure ingress ports fast enough to avoid overflow of the switch fabric egress buffers and egress card buffers.

Figure 2:
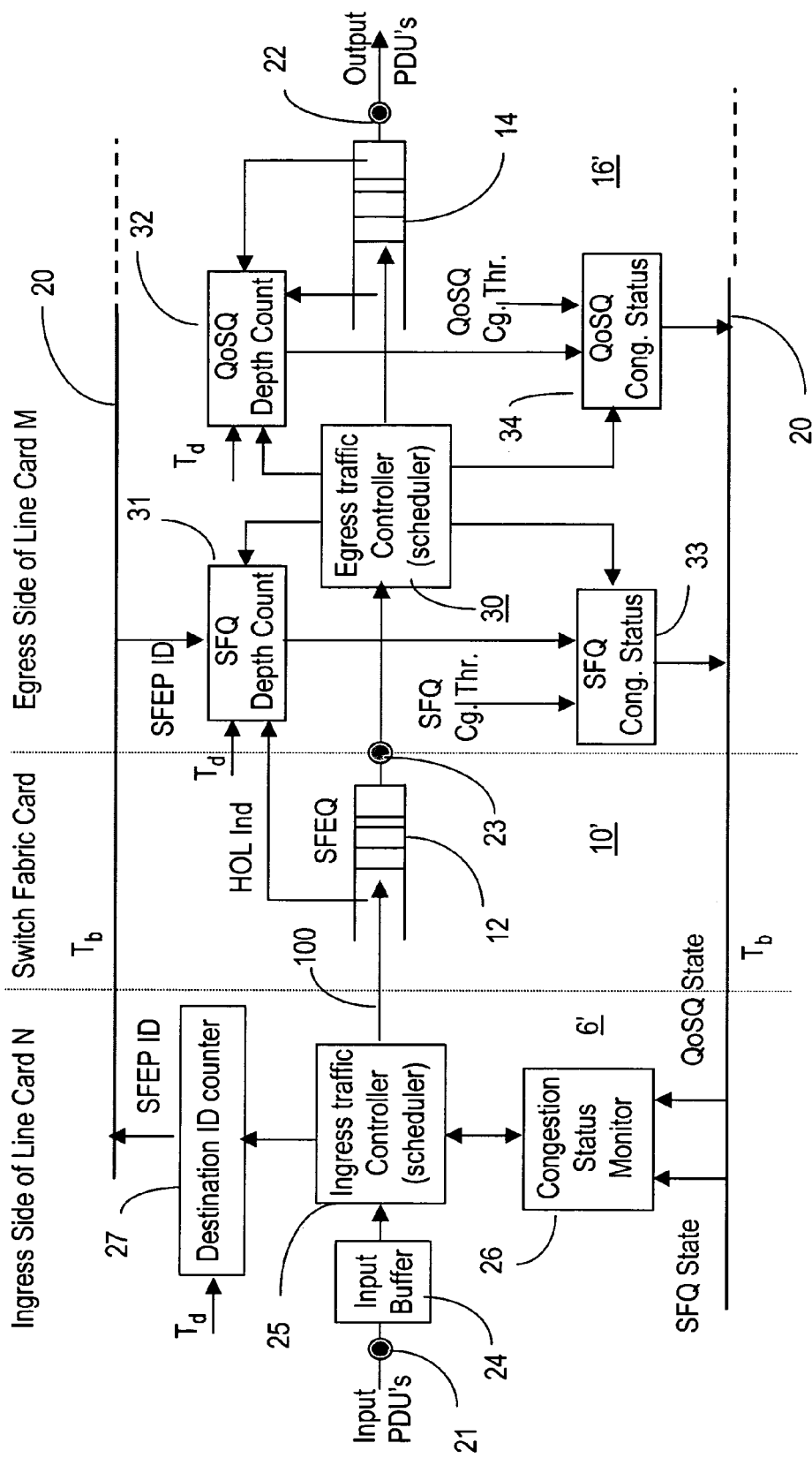
FIG. 2 shows a block diagram of the backpressure mechanism according to one embodiment of the invention.

FIG. 2 illustrates a more detailed block diagram of the backpressure mechanism according to one embodiment of the invention. It the datapath 100 for a PDU routed from an input port 21 to an output port 22 over a SF egress port 23. FIG. 2 also shows the units on the ingress, egress and switch fabric cards participating in the traffic transmission and backpressure mechanism, called herein ingress logic 6', SF logic 10', and respectively egress logic 16'.

Each ingress card is provided with an ingress traffic controller 25 which keeps track of the congestion status of the SF queues 12 at all egress ports 23 and of all logical queues 14 for all egress ports 22, as shown intuitively by state monitor 26. Controller 25 uses an ingress datapath PDU transmit mechanism whereby it reads from backpressure bus 20 state bits indicating the congestion state of queues 12 and 14, and updates accordingly a respective state variable counters maintained by monitor 26. Whenever an ingress port 22 is ready to transmit a PDU, state monitor 26 checks the state of both SF queue 12 and egress queue 14 for that PDU. The state of each egress queue 12, 14 may be indicated using one bit, for example using a logic "1" for a "send the next PDU" message and a logic "0" for a "stop, queue congested" message. The transmission of the PDU's is therefore continued or stopped according to this state information.

Ingress traffic controller 25 identifies first the SF egress port 23 and the egress port 22 based on the PDU address. Then, controller 25 identifies at egress port 22 the QoS queue 14 corresponding to the QoS of the PDU to be sent, and checks the status bit of the respective queue 14 based on congestion state variable of this queue. If the status bit for queue 14 indicates that the respective QoS queue 14 is not congested, then a second level comparison checks the congestion bit for the respective SF queue 12. If both conditions are met, the PDU is sent along the datapath from ingress port 21 to egress port 22 over SF queue 12, SF egress port 23 and egress queue 14. If either of these two queues is congested, the PDU cannot be sent, and controller 25 looks for the next PDU, and proceeds in a similar way.

Also, ingress logic 6' uses an ingress backpressure bus usage mechanism whereby the respective ingress ports send traffic statistics to the egress ports used to calculate the depth of queues 12, 14. The statistics include in this example the number of PDU's sent from ingress port 21 to egress port 22 during the previous datapath refresh cycle $T_d$. In the embodiment of FIG. 2, for every PDU sent, ingress logic 6' writes the unique identification of the egress port the PDU is destined to, as generically shown by the destination ID counter 27. The number of bits required for this information depends on the number of active ports in the backpressure system. The destination ID counters 27 that keep these statistics are reset at $T_d$ time. If no PDU has been sent in the last data refresh cycle, ingress port writes zeros.

These bits (traffic statistics) are broadcasted on bus 20. Egress logic 16' read the statistics, egress ports identify the bits that match their ID, and use this identification to increase a PDU count, meaning that a PDU has been sent its way by an ingress port. The identifier of egress port 22 is remembered in counter 27 until the next time port 21 writes onto backpressure bus 20. In practice, maximum two port ID's need to be stored for each ingress port, since the maximum of two packets can be sent during one refresh cycle $T_d$.

To summarize, ingress logic 6' writes and reads bits to/from bus 20 in a respective bus time slot. Each ingress logic 6' uses backpressure bus 20 to send statistics to egress logic 16' (writes on the bus the destination switch fabric egress port/ queue ID for every packet it has sent in the previous refresh cycle) and to receive a congestion state indication from the egress logic (reads from the bus the state bits for all SF and QoS queues).

The switch fabric logic 10' receives the PDU's and places them in a respective SF queue 12, according to the destination address. If the queue is over-flown, the switch is blocked and the PDU's are discarded, which results in poor quality transmission. For reducing occurrence of this situation, the depth of queue 12 is controlled over bus 20 form the egress cards 16.

Thus, egress logic 16' keeps track of the total number of PDU's received by the SF egress queue 12, denoted here with $PDU_{RxSF}$ and the number of PDU's transmitted from the respective SF egress port 23 in the last refresh cycle $T_d$, denoted herein with $PDU_{TxSF}$. A SF queue depth counter 31 calculates the difference $D_{SF}=PDU_{RxSF}-PDU_{TxSF}$ and adds it to, or subtracts it from, the current depth of the SF egress queue 12, to update the current depth of queue 12 with the number of PDU's added to or subtracted from the queue during the last refresh cycle. There are as many counters 31 per each ingress card, as there are switch fabric transmit queues 12.

The differences $D_{SF}=PDU_{RxSF}-PDU_{TxSF}$ (depth of queue 12) is determined by decrementing the queue depth counter 31 whenever a PDU is received from SF egress port 23, as long as the PDU has been sent by an ingress port that can report this action over the backpressure bus (i.e., can write onto the bus). Counter 31 is incremented whenever controller 30 observes that an ingress port 21 has sent a PDU to one of the switch fabric egress ports (as it reads from the bus the ID of a respective SF egress port transmitted by the ingress card).

As well, egress traffic controller 30 keeps track of the total number of PDU's received by each QoS queue 14 denoted here with $PDU_{RX}$ and the number of PDU's/transmitted from the respective egress port 22 in the last refresh cycle $T_d$, denoted here with $PDU_{Rx}$. A QoS queue depth counter 32 maintains the difference $D=PDU_{Rx}-PDU_{Tx}$ and adds it to, or subtracts it from the current depth of the egress queue 14, to update the current depth of queue 14 with the number of PDU's added to or subtracted from the queue during the last refresh cycle.

The difference $D=PDU_{Rx}-PDU_{Tx}$ (depth of queue 14) is determined by incrementing the queue depth counter 32 at the arrival of a PDU at a respective egress card port. At the departure of the PDU from the output port queue 14, counter 32 is decremented. In addition, whenever egress traffic controller 30 observes that switch fabric egress port is not in use, it resets counter 32 to zero.

The embodiment of FIG. 2 uses two thresholds for determining the congestion state indication for each datapath established between any two ingress/egress ports. Namely, it uses a first congestion threshold hereinafter called the "QoS queue congestion threshold" for queue 14 and a second congestion threshold for SF queue 12, hereinafter called the "SF queue congestion threshold". A SF egress queue congestion status unit 33 calculates the congestion state of SF egress queue by comparing the SF congestion threshold with the depth $D_{SF}$ of the respective queue. A QoS queue congestion status unit 34 calculates the congestion state of QoS queue 14 by comparing a QoS threshold with the depth D of the respective egress queue.

Each time a PUD exits a respective queue 12, controller 30 updates congestion state unit 33 with the current states of the respective queues, based on depth $D_{SF}$. Similarly, each time a PUD exits a respective queue 14, controller 30 updates the congestion state unit 34 with the current states of the respective queues, based on depth D.

The egress logic 16' broadcasts the state bits to all ingress ports. The ingress ports update the state variables for each queue 12, 14, using the signals egress cards send over backpressure bus 20. Then, the ingress card checks the state values for the respective destination ports every time it has a PDU to send for determining whether the respective queues along datapath 100 are congested or not.

To summarize, every backpressure bus cycle $T_b$ the egress logic 16' updates or not the congestion state bits for queues 12 and 14 and broadcasts this congestion state indication on bus 20 to all ingress ports. At the ingress card, the ingress logic 6' receives the queues states, and resumes or stops transmission of the PDU's along the respective datapath based on these states. Also, every backpressure bus cycle $T_b$ the egress logic 16' receives from the ingress logic 6' the traffic statistics (the number of PDU transmitted from the ingress ports) and uses the statistics to update the current depth of the respective queues 12, 14.

The backpressure mechanism can operate with or without congestion indications from the switch fabric card 10; FIG. 2 shows an embodiment where the switch fabric 10 sends bits indicating the congestion status in SF egress queues 12. As this additional congestion status data is used for estimating the congestion state of SF queue, only the egress logic 16' uses these bits. For example, the message transmitted on bus 20 by switch fabric card 10 may notify egress logic 16' whether the Head Of Line (HOL) threshold has been crossed or not. If the data refresh cycle $T_d$ is much longer than the backpressure bus refresh cycle $T_b$, this message will be unchanged during multiple bus refresh cycles. These bits may also be used to check and adjust, if needed, an estimated value of the transmit queue depth calculated at egress cards. In some cases, once one of state bits is set when the HOL threshold has been crossed, it may stay unchanged for a period of time much longer than the data refresh cycle $T_d$. During this time, egress logic completely rely on this estimated queue depth.

To solve this problem, another feature may be used by the egress logic to adjust the queue depth value. For example, egress logic 16' could count the number of the bytes received from the switch fabric egress port 23 over a period of time, which depends on the link speed. If this number is zero, it is assumed that queue 12 is empty. If the current queue depth value is different from zero, it is reset to zero at this point.

Figure 3:
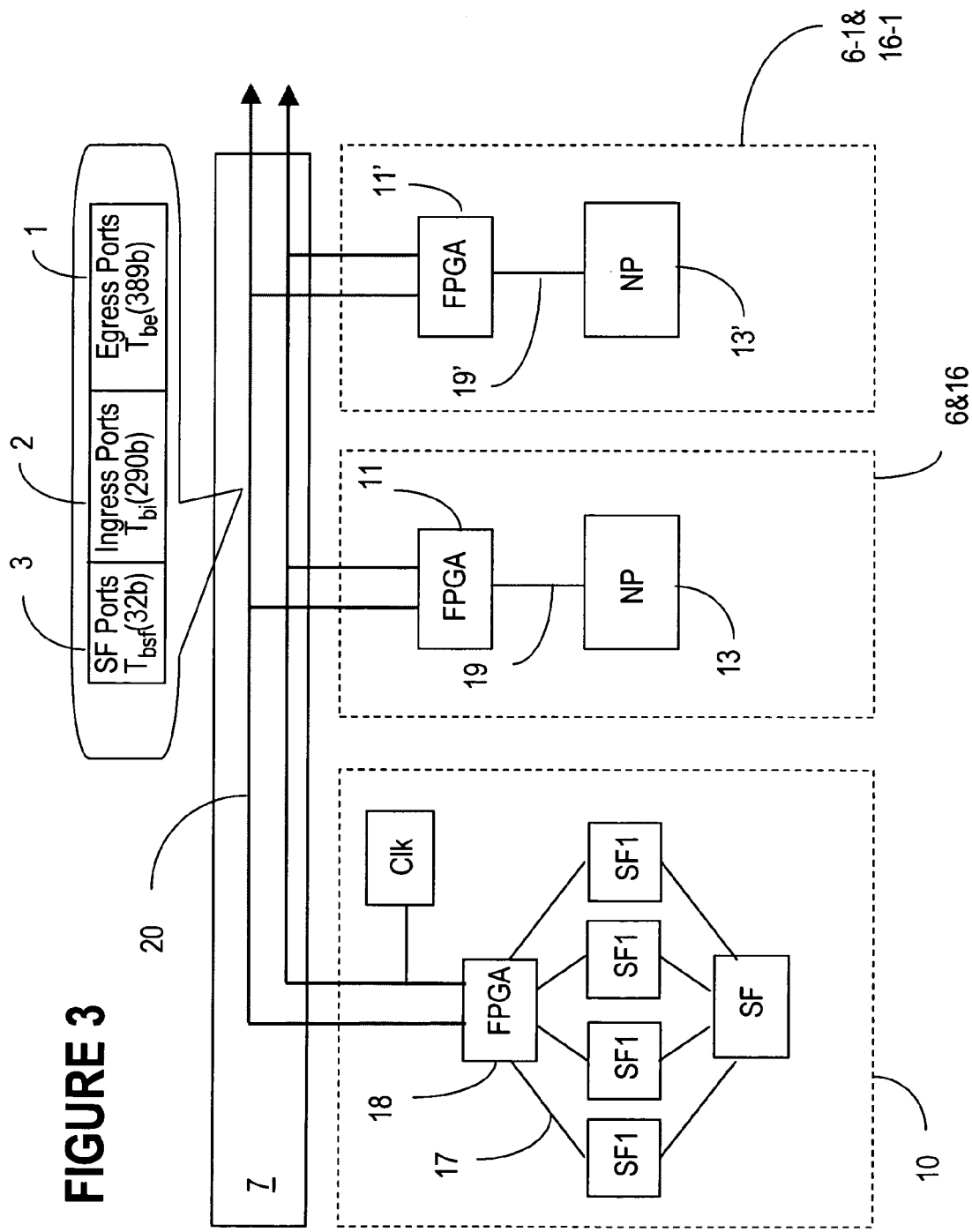
FIG. 3 illustrates an implementation of the backpressure bus and associated logic for a specific node configuration.

FIG. 3 illustrates an example of a practical implementation of the backpressure mechanism, for a specific switch configuration. The line cards 6, 16 may be voice (analog) or/and data cards that are connected to the backpressure bus 20 over backplane 7. Voice cards only send PDU's to data cards, the switch management card 10 or control processor cards; there is minimal or no communication between voice cards.

In a working example, the configuration includes 8 data cards with 2×100 M ports to the switch management card 10', and 9 voice cards with a 1×100 M port to the card 10'. Each card has a maximum of four ports. In this embodiment, the backpressure bus logic is implemented using FPGA's such as shown at 11, 11' connected to a network processor 13, 13' via a bus 19, 19' on each line card. The FGPA's are used to interconnect the backpressure bus 20 to the network processors 13, 13' in situations where the network processor and the backpressure bus have different interconnection specifications. The network processors may be for example IXP1200's and the bus 19, 19' may be IX buses. The network processors 13, 13' maintain the ingress and egress logic 6', 16' for all ports of the respective card.

The switch management card 10' comprises in this embodiment a crossbar device SF (e.g. a SMC 48300) and four SF-1 devices (e.g. SMC 48310) that may provide the additional congestion status data via an interface 17 to a FGPA 18, which in turn is connected over bus 20.

The format of the backpressure bus frame for this configuration is also illustrated in the insert on FIG. 3, by way of example. The frame comprises a 389-bit field 1 reserved for the bits transmitted by the egress logic, a 290-bit field 2 reserved for the bits transmitted by the ingress logic, and a 32-bit field 3 reserved for the switch fabric, described next. In this example, the total length of the backpressure frame is 561 bits, which results in a bus speed of 52.91 Mbps.

The egress ports field 1 ($T_{be}$) is reserved for enabling the egress logic to broadcast the state variables to the ingress logic. Each egress data card writes 38 bits per backpressure frame $T_b$. Six bits out of these 38 are reserved for congestion statuses of two SF egress queues 12 (3 bits per queue). The rest of 32 bits are reserved for updating congestion statuses of egress port queues 14 (4 ports/card, and 8 QoS queues/port) one bit per QoS queue. Each voice card (there are 9 voice cards in this embodiment) also writes one bit per backpressure frame, but in this case, regardless which queue 12, 14 is congested, this bit is set to logic "0" to backpressure all respective ingress cards. As such, $T_{be}$=389 bits in this example.

As indicated above, each ingress port writes the unique identifier of the egress port for every packet it has sent during the last refresh cycle. The maximum number of packets one ingress port can send in one refresh cycle is two. Therefore, each ingress port writes 10 bits during a timeslot $T_{bi}$ within the backpressure bus frame. In total, 29 ingress ports use 290 bits ($T_{bi}$=290 bits) per one bus frame, as shown in this example by field (timeslot) 2. These bits are broadcast on backpressure bus 20, and each egress card is supposed to read the bits destined for it, for calculating the respective queue depths and congestion state variables.

Field 3 is reserved for the SF ports, which may write on the backpressure bus as shown in the embodiment of FIG. 2. In this case, only the egress ports have access to this timeslot, to receive additional congestion status data regarding the SF egress queues 12. In this example, field 3 is $T_{bsf}$=5 bits, to enable identification of unique 32 ($2^5$) egress ports.

Although the invention is described herein with reference to specific hardware and software implementations for the purposes of providing a clearer explanation of the invention, it will be apparent to one of ordinary skill in the art that the inventions as described in the attached claims will have application in a variety of different communication environments.

We claim:

1. At a communication node for routing a protocol data unit (PDU) along a datapath established between an ingress port and an egress port through a switch fabric (SF) egress port, a backpressure mechanism, comprising:
    a backpressure bus for establishing an out-of-band bidirectional connection between said ingress port and said egress port;
    egress logic for estimating a congestion state indication characterizing the congestion along said datapath; and
    ingress logic for controlling transmission of said PDU along said datapath based on said congestion state indication,
    wherein said egress logic transmits said congestion state indication to said ingress logic over said backpressure bus, while said ingress logic transmits traffic statistics to said egress logic over said backpressure bus,
    said congestion state indication includes a SF queue congestion state that measures the congestion at said egress port,
    additional congestion data regarding a SF queue are written at said SF egress port,
    said additional congestion data are read, and
    said SF queue congestion state is adjusted according to said additional congestion data.

2. The backpressure mechanism of claim 1, wherein said egress port maintains a QoS queue for holding said PDU in an order of arrival at said egress port, based on the QoS queue of said PDU said SF egress port maintains said SF queue for holding said PDU in the order of arrival at said SF egress port.

3. The backpressure mechanism of claim 1, wherein the refresh cycle for said datapath is $T_d$ and the refresh cycle for said backpressure bus is $T_b < T_d$.

4. The backpressure mechanism of claim 2, wherein said congestion. state indication includes a QoS queue congestion state that provides a measure for the congestion of said QoS queue.

5. The backpressure mechanism of claim 4, wherein said egress logic comprises:
    an egress traffic controller for transmitting said PDU from said SF egress port into said QoS queue;
    a QoS depth counter for determining a current depth (D) of said QoS queue; and
    a QoS queue congestion status unit for comparing said current depth D with a QoS congestion threshold and generating said QoS queue congestion state.

6. The backpressure mechanism of claim 4, wherein said egress logic comprises:
    an SF queue depth counter for determining a current depth ($D_{SF}$) of said SF queue; and
    an SF queue congestion status unit for comparing said current depth $D_{SF}$ with a SF congestion threshold and generating said SF queue congestion state.

7. The backpressure mechanism of claim 1, wherein said ingress logic comprises:

a congestion status monitor for holding said congestion state indication received over said backpressure bus;

an ingress traffic controller for identifying said SF queue and a QoS queue for said PDU and scheduling transmission of said PDU along said datapath according to said congestion state indication; and a destination ID counter for generating said traffic statistics and transmitting said traffic statistics to said egress port along said backpressure bus.

8. The backpressure mechanism of claim 1, wherein said traffic statistics include a count of PDUs transmitted from said ingress port along said datapath during a last data refresh cycle $T_d$.

9. The backpressure mechanism of claim 8, wherein said count is evaluated from the identification of said SF egress port.

10. The backpressure mechanism of claim 1, wherein said backpressure bus operates according to a time division multiplexing (TDM) protocol, using a fixed length backpressure frame.

11. The backpressure mechanism of claim 10, wherein said egress port writes said congestion state indication on said backpressure bus during a timeslot $T_{be}$ allocated within said backpressure frame, while said ingress port reads said congestion state indication from said timeslot $T_{be}$.

12. The backpressure mechanism of claim 10 wherein said ingress port writes on said backpressure bus said traffic statistics during a timeslot $T_{bi}$ allocated within said backpressure frame, while said egress port reads said traffic statistics from said timeslot $T_{bi}$.

13. The backpressure mechanism of claim 10, wherein said SF egress port writes on said backpressure bus additional congestion status data during a timeslot $T_{bsf}$ allocated within said backpressure frame, while said egress port reads said additional congestion status data from said timeslot $T_{bsf}$.

14. A computer readable medium encoded with instructions capable of being executed by a computer to establish a frame for an out-of-band backpressure bus for providing a closed loop along a datapath established between an ingress port and an egress port over a switch fabric (SF) egress port of a communication node, said medium comprising:

instructions for establishing an egress port timeslot $T_{be}$ for carrying a congestion state indication providing the congestion state of said datapath for a data refresh interval $T_d$;

instructions for establishing an ingress port timeslot Tbi for carrying a count of PDUs transmitted to said SF egress port during said data refresh interval $T_d$;

instructions for defining a congestion state indication that includes a SF queue congestion state measuring the congestion at said egress port;

instructions for writing additional congestion state data regarding a SF queue at said SF egress port;

instructions for reading said additional congestion data at said egress port; and instructions for adjusting said SF queue congestion state according to said additional congestion data.

15. The frame format of claim 14, further comprising instructions for establishing a SF timeslot $T_{bsf}$ for carrying additional state data regarding the congestion at said SF egress port for said data refresh interval $T_d$.

16. The frame format of claim 14, wherein said congestion state indication includes a QoS queue congestion state that provides a measure for the congestion at said egress port, and a SF queue congestion state that provides a measure for the congestion at said SF egress port.

17. A method for improving traffic throughput along a datapath established at a communication node between an ingress port and an egress port through a switch fabric (SF) egress port, comprising:

estimating a congestion state indication characterizing the congestion along said datapath, wherein said congestion state indication includes a SF queue congestion state that measures the congestion at said egress port;

establishing an out-of-band bidirectional connection between said ingress port and said egress port using a backpressure bus;

transmitting said congestion state indication to said ingress port over said backpressure bus, and transmitting traffic statistics to said egress port over said backpressure bus, at said SF egress port, writing on a SF ports field additional congestion state data regarding a SF queue;

at said egress port, reading said additional congestion data from said SF ports field;

adjusting a SF queue congestion state according to said additional congestion data; and controlling transmission of a PDU along said datapath based on said congestion state indication.

18. The method of claim 17, wherein said congestion state indication includes a QoS queue congestion state that measures the congestion at said SF egress port.

19. The method of claim 18, further comprising the steps of:

placing said PDU into a QoS queue in the order of arrival at said egress port, based on the QoS of said PDUs;

determining a depth D of said QoS queue;

comparing said depth D with a QoS congestion threshold for generating said QoS queue congestion state.

20. The method of claim 19, further comprising the steps of:

placing said PDU into said SF queue in the order of arrival at said SF egress port;

determining a depth $D_{SF}$ of said SF queue;

comparing said depth $D_{SF}$ with a SF congestion threshold for generating said SF queue congestion state.

21. The method of claim 19, further comprising the steps of:

determining the number of PDUs placed in said QoS queue during a last data refresh cycle;

determining the number of PDUs transmitted from said QoS queue during said last data refresh cycle; and determining an updated depth D' for a current data refresh cycle, by adding the difference between the number of PDUs placed in said QoS queue and the number of PDUs transmitted from said QoS queue to said depth D.

22. The method of claim 20, further comprising the steps of:

establishing from said traffic statistics a PDU count indicative of the number of PDUs placed in said SF queue during a last data refresh cycle;

determining the number of PDUs transmitted from said SF queue during said last data refresh cycle; and determining an updated depth $D_{SF}'$ for a current data refresh cycle by adding the difference between the number of PDUs placed in said SF queue and the number of PDUs transmitted from said SF queue to said depth $D_{SF}$.

23. The method of claim 18, further comprising the steps of:

providing a TDM protocol for said backpressure bus, with a fixed length frame of a refresh cycle $T_b$;

allocating within said frame an egress ports field $T_{be}$, an ingress ports field $T_{bi}$ and a SF ports field $T_{bsf}$; and allocating a timeslot for each said ingress, egress and SF port in said respective field, wherein when one of said ports writes on said backpressure bus, all remaining ports may read from said backpressure bus.

24. The method of claim 23, further comprising the steps of:

at said egress port, writing in said egress ports field $T_{be}$ said QoS queue congestion state and said SF queue congestion state and reading from said ingress ports field $T_{bi}$ said traffic statistics; and at said ingress port, writing into said ingress ports field $T_{bi}$ said traffic statistics, and reading said QoS queue congestion state and said SF queue congestion state from said egress ports field $T_{be}$.

25. The method of claim 18, further comprising the steps of:

receiving at said ingress port said QoS queue congestion state and said SF queue congestion state;

determining if a QoS queue is congested;

if said QoS queue is not congested, determining if said SF queue is congested;

if said SF queue is not congested, transmitting said PDU from said ingress port to said egress port along said datapath; and discarding said PDU if any of said SF queue and said QoS queue is congested.

* * * * *